United States Patent
Sadayama et al.

(10) Patent No.: US 7,494,575 B2
(45) Date of Patent: Feb. 24, 2009

(54) METHOD FOR MANUFACTURING A SPLIT PROBE

(75) Inventors: Shoji Sadayama, Chiba (JP); Yoshiharu Shirakawabe, Chiba (JP); Kazutaka Takahashi, Chiba (JP)

(73) Assignee: SII NanoTechnology Inc. (JP)

( * ) Notice: Subject to any disclaimer, the term of this patent is extended or adjusted under 35 U.S.C. 154(b) by 768 days.

(21) Appl. No.: 10/822,994

(22) Filed: Apr. 13, 2004

(65) Prior Publication Data

US 2005/0133717 A1    Jun. 23, 2005

(51) Int. Cl.
*C23C 14/34*    (2006.01)
*C23F 1/00*    (2006.01)

(52) U.S. Cl. .......................... 204/192.34; 204/192.32; 216/66

(58) Field of Classification Search ............ 204/192.32, 204/192.34; 216/66
See application file for complete search history.

(56) References Cited

U.S. PATENT DOCUMENTS

| | | | | |
|---|---|---|---|---|
| 5,482,802 | A | * | 1/1996 | Celler et al. ................. 430/5 |
| 6,177,670 | B1 | * | 1/2001 | Sugiyama ................. 250/307 |
| 2002/0125427 | A1 | * | 9/2002 | Chand et al. ............... 250/306 |
| 2002/0158480 | A1 | | 10/2002 | Nakayama et al. | 
| 2002/0166976 | A1 | | 11/2002 | Sugaya et al. |

FOREIGN PATENT DOCUMENTS

| | | | |
|---|---|---|---|
| JP | 05-015981 | | 1/1993 |
| JP | 11-219680 | | 8/1999 |
| JP | 2001-252900 | | 9/2001 |
| JP | 2002-333387 | | 11/2002 |
| KR | 2001-065673 | * | 7/2001 |

* cited by examiner

*Primary Examiner*—Rodney G McDonald
(74) *Attorney, Agent, or Firm*—Adams & Wilks

(57) ABSTRACT

A method of manufacturing a split probe tip on a cantilever comprises providing a cantilever having a surface on which is formed a probe that projects outwardly from the surface at one end of the cantilever, irradiating and scanning a tip of the probe with a focused particle beam directed in a direction that is inclined relative to the surface of the cantilever to obtain an image of the probe tip, and determining the center of the probe tip from the image of the probe tip. Then a first channel is formed in the probe tip at the center thereof by irradiating and scanning the center of the probe tip with a focused particle beam to form a split probe tip having two spaced-apart probe tip parts. The forming step comprises using the focused particle beam to form a first channel section that extends radially inwardly from a periphery of the probe tip, and then using the focused particle beam to form a second channel section that extends radially inwardly from the periphery of the probe tip at a location opposite the first channel section and that connects to the first channel section to define therewith the first channel.

20 Claims, 3 Drawing Sheets

FIG. 5A
FIG. 5B
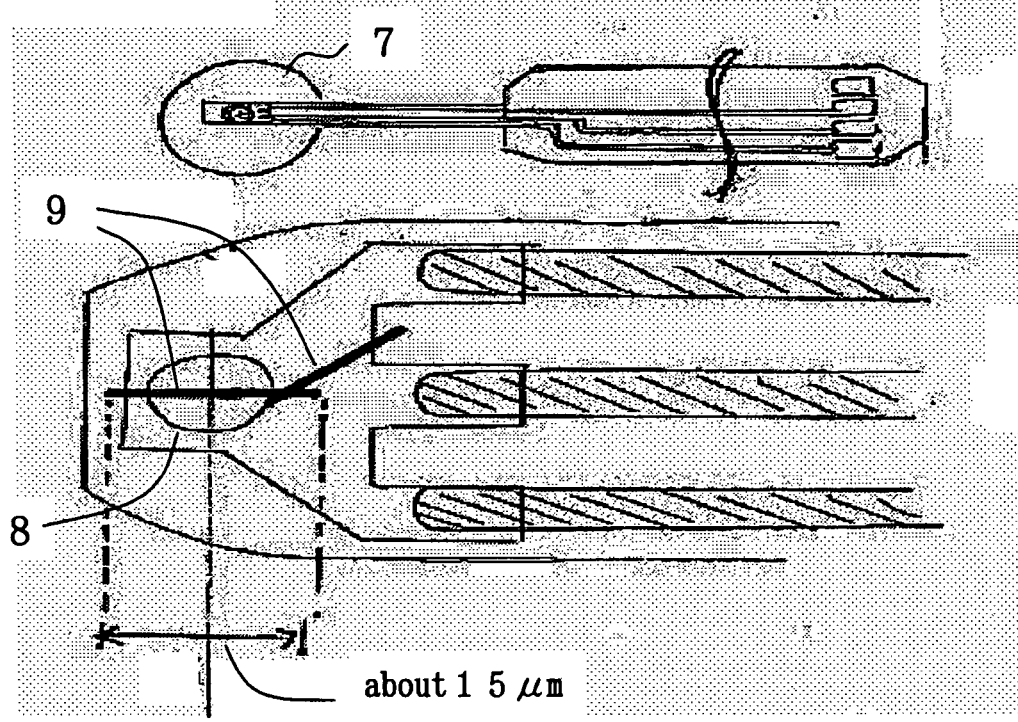
FIG. 5C

METHOD FOR MANUFACTURING A SPLIT PROBE

BACKGROUND OF THE INVENTION

1. Field of the Invention

The present invention relates to a method for manufacturing split probes used as probes and nano-forceps in scanning of semiconductors.

2. Description of Related Art

A method for manufacturing micro-forceps using a focused ion beam device on the tip of a probe of a microcantilever used as a probe microscope probe has recently drawn attention (refer to patent document 1).

A split probe of the related art is shown in FIG. 5. FIG. 5(a) is a side view of a microcantilever, where numeral 8 is a cantilever probe. FIG. 5(b) is the upper surface of the microcantilever. FIG. 5(c) is an enlarged view of portion 7 of FIG. 5(b). In a typical method taken as a specific procedure for manufacturing microforceps, the whole of a probe 8 is irradiated with a beam that has been finely focused by a focused ion beam device without tilting a sample, an image for the whole of the scanned probe 8 is obtained, and a processing position is decided. A process of forming a channel 9 by making insulating locations on the cantilever that are to be severed face the beam from a center part of the tip of the probe on the microcantilever and then irradiating and scanning just a specific two locations is then carried out. The tip of the probe 8 is then split into a two-electrode structure where each electrode is electrically conductive.

"Patent Document 1"

Japanese Patent Laid-open Publication No. 2001-252900 ([0048], FIG. 10, FIG. 11).

However, in the related processing method, 1) The radius of curvature of the cantilever probe tip is small at 100 nm or less. It is therefore difficult to determine the central part of the cantilever probe tip in methods for specifying processing position using an image for the whole tip taken from above, and splitting the true center into two is therefore difficult. 2) Because the whole of the probe is processed using the same focused ion beam current, a relatively large focused ion beam current is used in the processing, and the channel processing width therefore becomes large. A large processing channel means that the distance between the divided electrodes is large, and it is difficult to obtain the desired electrode pitch when using the split probe as microscopic electrodes as is. Further, for example, during the assembly of, for example, carbon nanotubes, gaps open up between fellow carbon nanotubes so that, for example, a voltage applied during electrostatic driving has to be made high. 3) When an extremely narrow range of a cantilever probe is irradiated and scanned in order to decide processing position using the focused ion beam current amount using 2), the etching speed is fast because the ion beam current is large. This causes damage to the tip of the probe of the cantilever greater than that which is tolerated, so as to bring about problems such as, for example, localized peeling of conductive coats and non-uniformity of electric field, and localized increases in electrical resistance.

SUMMARY OF THE INVENTION

In order to resolve the aforementioned problems, the present invention provides a simple method for manufacturing a more finely detailed split probe with less damage being incurred.

In order to resolve the problems described above, the following method is used in a method for manufacturing a split probe of the present invention.

1. A method is provided for easily deciding a processing position by making it easy to determine the center of a probe tip by tilting the whole of a microcantilever.

2. A method for processing channels is provided employing a small focused ion beam current in processing of an extremely narrow range of a probe tip of a microcantilever and employing a focused ion beam current larger than the aforementioned processing current in processing of a broader range.

BRIEF DESCRIPTION OF THE DRAWINGS

FIGS. 5A-5C are schematic views of a conventional split probe provided on a microcantilever.

DETAILED DESCRIPTION OF THE PREFERRED EMBODIMENTS

Figure 1:
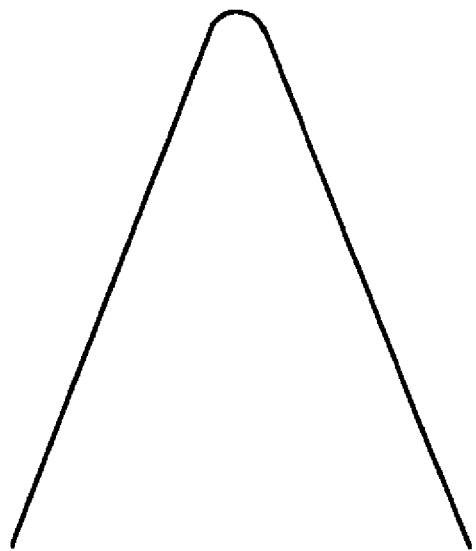
FIG. 1 is a schematic view showing a SIM image of a probe tip with the probe tip inclined.

The following is a description of embodiments of this invention using the drawings. In the drawings, the relationship of the size, shape and arrangement of each structural component is shown in outline to an extent that this invention may be understood and numerical conditions given in the following description are merely given as an illustration.

A first embodiment of the present invention is now described with reference to the drawings.

FIG. 1 is a SIM image of a probe tip that is formed when a focused and scanned ion beam current of 1 pA is irradiated only on the very tip of the cantilever with the whole of a cantilever inclined at an angle of sixty degrees to the longitudinal direction taking the horizontal as 0 degrees, i.e., the irradiating direction of the focused ion beam is inclined sixty degrees relative to the surface of the cantilever on which the probe is formed. Secondary charged particles emitted at the time of irradiation with the ion beam are detected, and an SIM image of the probe tip is obtained when a secondary particle signal intensity is displayed on a CRT in synchronism with the scanning signal. A SIM image for the probe tip is shown in FIG. 1.

Figure 2:
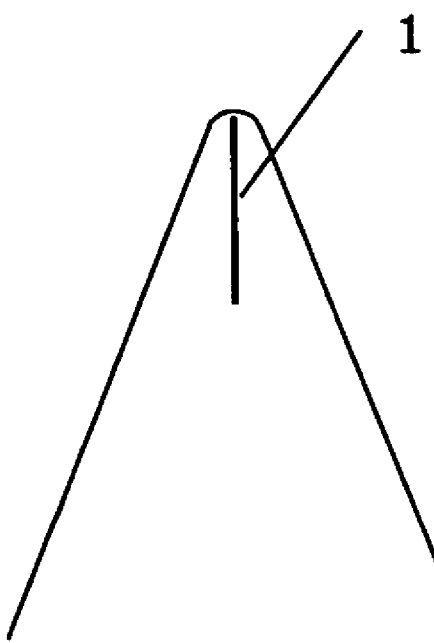
FIG. 2 is a schematic view showing a SIM image of a probe tip after channel processing with the probe tip inclined.

Next, after processing position deciding is carried out from the SIM image of FIG. 1, processing for a channel or channel section is carried out using the same focused ion beam current as for the irradiation and scanning in FIG. 1 in order to divide or split the probe tip into two. The channel 1 is shown in FIG. 2. Processing is not carried out through 180 degrees to the opposite side of the probe tip because the ion beam current is low. Because of this, the inclination of the entire cantilever is left as is, and a channel or channel section 2 is processed using the same method as for channel 1 at the opposite section of the probe after rotation through 180 degrees on an axis vertical to the microcantilever, so that the channel 1 and the channel 2 are connected together. The channels 1 and 2 extend radially from the periphery of the probe tip from opposite locations that are 180° apart and intersect and connect with one another to form a channel that splits the probe tip into two spaced-apart probe tip parts. In fact, since the microcantilever is disposed on the sample stage, the sample stage is rotated 180 degrees so as to rotate the microcantilever after carrying out processing for the first channel, and with the direction maintained the probe tip is positioned under the focused ion beam and scanned and grooved by the focused ion beam to form channel 2. When forming channel 2, the sample state is rotated 180 degrees in the above process. But it is available to scan the focused ion beam at the tip center of the probe after positioning it under the focused ion beam after returning the sample stage to the horizontal position.

Figure 3:
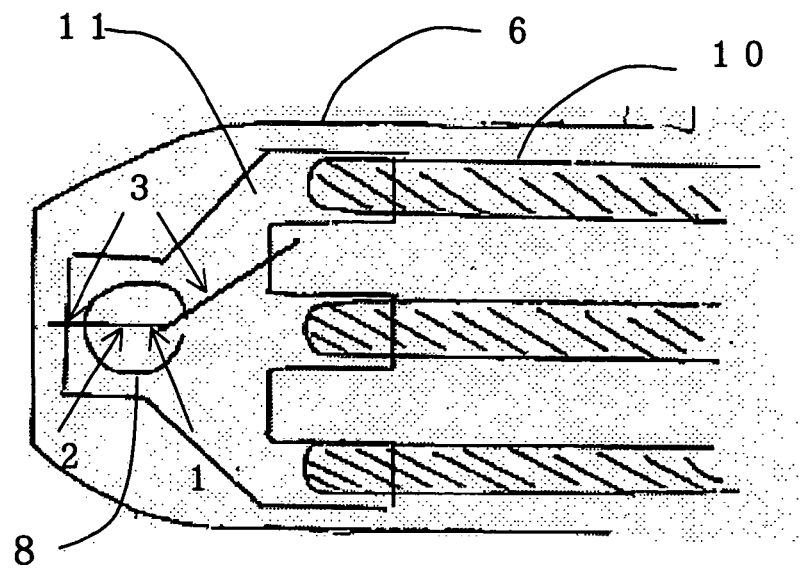
FIG. 3 is a top view of a probe portion of a microcantilever after channel processing.
Figure 4:
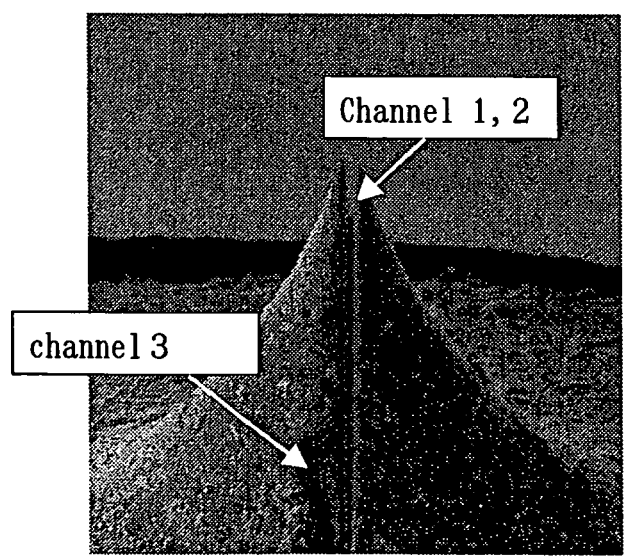
FIG. 4 is a SIM image of channels 1, 2 and 3 formed in a probe of a microcantilever.

After carrying out processing for the first and second channels, processing is carried out to make a channel connecting these channels. This is shown in FIG. 3. In FIG. 3, numeral 10 is a wiring pattern formed on the cantilever substrate surface, and numeral 11 is a conductive film formed on the cantilever substrate surface and probe connecting with the wiring pattern 10. In FIG. 3, after the whole of the cantilever 6 is returned to a horizontal or non-tilted state, the channel 3 is formed radially at two locations from the point of intersection of the channels 1 and 2. The conductive film 11 is divided by the channel 3. The processing of the channel 3 is carried out using a focused ion beam current of 50 pA. After processing channel 1 and channel 2, by processing the channel 3, the probe tip is electrically separated or divided into two parts and conductivity is lost, so as to form a two-electrode structure. FIG. 4 shows processing channels 1, 2 and 3 formed in a probe of a microcantilever using the method of the present invention as an SIM image. Channels of processing widths of 10 to 500 nm can be formed at the central position of the probe tip.

A focused ion beam as one kind of particle beam is used in processing of the channel but finer processing is possible if other particle beams such as an electron beam, etc. is used. In this embodiment, an example of processing a probe on a microcantilever is shown, but this method may also be similarly applied to processing of a probe arranged on, for example, a membrane. The present invention is also effective for a cone, triangular pyramid, or polygonal pyramid having a pinnacle with a radius of curvature of 100 nm or less.

The split probe is such that a single terminal (for example, a carbon nanotube) may be fitted to the split probe itself or to each terminal, and may be used as nano-forceps.

This may then be used as a semiconductor scanning probe or a probe card by arranging a plurality of cantilever beams having the split probes or arranging a plurality of the split probes on the surface of the same probe card.

As described in detail above, according to this invention, the following effects are obtained by channel processing the split-probe tip in a split-tip manufacturing process.

The entire structure itself is tilted, and probe tip processing is carried out. It is therefore easy to determine the central part of the probe tip. Further, a small focused ion beam current is employed. It is therefore possible to make two electrodes with a minimum channel processing width, and there is little damage to the processing portion. Further, in the probe tip channel processing, processing takes place with a small focused ion beam current, and in channel processing in order to divide the electrodes connected to these channels, processing is carried out using a large focused ion beam current, and throughput can therefore be increased.

Moreover, this is formed with a smaller channel processing width. Clenching precision of the forceps can therefore be improved.

What is claimed is:

1. A method for manufacturing a split probe by channel processing a probe tip on a microcantilever, comprising the steps of:

tilting the microcantilever;

scanning and irradiating the probe tip of the tilted microcantilever with a focused ion beam to obtain a SIM image of the probe tip;

deciding a central position of the probe tip from the obtained SIM image of the probe tip; and forming a split section in the probe tip by scanning and irradiating the decided central position using a focused ion beam so as to form a first channel.

2. The method for manufacturing a split probe according to claim 1, wherein the first channel is also formed by irradiating the focused ion beam at the central position after being rotated 180 degrees around an axis vertical to the microcantilever.

3. The method for manufacturing a split probe according to claim 1, wherein conductivity of the divided probe tip is cut by forming a second channel connecting to the first channel at a conductive portion covering the microcantilever either after or before processing of the probe tip.

4. The method for manufacturing a split probe according to claim 3, wherein focused ion beam processing current at the time of forming the second channel is larger than focused ion beam processing current for forming the first channel.

5. The method for manufacturing a split probe according to claim 3, wherein a width of the second channel is broader than that of the first channel.

6. The method of manufacturing a split probe according to claim 3, wherein processing depth during processing of the first and second channels is of an extent that does not pass through an insulation film at a lower part of a conductive film.

7. The method for manufacturing a split probe according to claim 1, wherein processing of the probe tip is carried out by changing the tilt angle of the entire microcantilever a plurality of times.

8. A method for manufacturing a split probe by channel processing a probe tip on a microcantilever, comprising:

a first step of deciding a central position and a processing position of a probe tip using an SIM image of the probe tip obtained by irradiating and scanning only the very tip of the probe of the microcantilever with a focused ion beam current with the whole of the microcantilever in a tilted state;

a second step of channel processing the probe tip with the whole of the microcantilever tilted; and a third step of returning the whole of the microcantilever to a horizontal position and further channel processing the probe tip.

9. A method for manufacturing a split probe by channel processing a probe tip on a microcantilever, comprising:

a first step of deciding a central position and a processing position of a probe tip using an SIM image of the probe tip obtained by irradiating and scanning only the very tip of the probe of the microcantilever with a focused ion beam current of 10 pA or less with the whole of the microcantilever in a tilted state;

a second step of carrying out first channel processing of the probe tip using a focused ion beam current of 10 A or less with the whole of the microcantilever tilted; and a third step of returning the whole of the microcantilever to a horizontal position, switching over to a larger focused ion beam current than the focused ion beam current used in the first and second steps, and performing processing for a second channel connecting with the first channel by cutting a conductive film spanning from the probe base to the base of the microcantilever.

10. A method of manufacturing a split probe tip on a cantilever, comprising the steps of:

providing a cantilever having a surface on which is formed a probe that projects outwardly from the surface at one end of the cantilever;

irradiating and scanning a tip of the probe with a focused particle beam while the cantilever is in a tilted state so that the irradiating direction of the focused particle beam is inclined relative to the surface of the cantilever to obtain an image of the probe tip;

determining the center of the probe tip from the image of the probe tip; and forming a first channel in the probe tip at the center thereof by irradiating and scanning the center of the probe tip with a focused particle beam to form a split probe tip having two spaced-apart probe tip parts.

11. A method according to claim 10; wherein the forming step comprises using the focused particle beam to form a first channel section that extends radially inwardly from a periphery of the probe tip, and then using the focused particle beam to form a second channel section that extends radially inwardly from the periphery of the probe tip at a location opposite the first channel section and that connects to the first channel section to define therewith the first channel.

12. A method according to claim 11; wherein in the irradiating and scanning step, only the tip of the probe is irradiated and scanned with the focused particle beam.

13. A method according to claim 11; wherein the providing step includes providing a cantilever having a conductive film formed on the surface of the cantilever and on the probe; and further including the step of using a focused particle beam to form a second channel that extends completely through the conductive film and that connects to the first channel to electrically separate the two probe tip parts from one another.

14. A method according to claim 13; wherein the focused particle beam current used in forming the second channel is larger than that used in forming the first channel.

15. A method according to claim 11; wherein the focused particle beam is a focused ion beam.

16. A method according to claim 15; wherein the focused ion beam current used to obtain an image of the probe tip and the focused ion beam current used to form the first channel are both 10 pA or less.

17. A method according to claim 15; wherein the forming step includes forming the first channel section with the cantilever in the tilted state and forming the second channel region with the cantilever tilted 180° from the tilted stated.

18. A method according to claim 17; further including the steps of placing the cantilever, after forming the first channel, in a non-tilted state in which the cantilever surface is normal to the irradiating direction of the focused ion beam; and using a focused ion beam to form a second channel in the probe that connects to the first channel and that extends to a base of the probe.

19. A method according to claim 18; wherein the focused particle beam current used in forming the second channel is larger than that used in forming the first channel.

20. A method according to claim 10; wherein the forming step is carried out with the cantilever in the tilted state so that the irradiating direction of the focused particle beam is inclined relative to the cantilever surface.

\* \* \* \* \*